United States Patent
Matsumoto

(10) Patent No.: US 8,442,601 B2
(45) Date of Patent: May 14, 2013

(54) MOBILE PHONE APPARATUS

(75) Inventor: Hiroko Matsumoto, Daito (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 13/380,462

(22) PCT Filed: Jun. 22, 2010

(86) PCT No.: PCT/JP2010/060514
§ 371 (c)(1),
(2), (4) Date: Dec. 22, 2011

(87) PCT Pub. No.: WO2010/150765
PCT Pub. Date: Dec. 29, 2010

(65) Prior Publication Data
US 2012/0094725 A1 Apr. 19, 2012

(30) Foreign Application Priority Data
Jun. 26, 2009 (JP) .................. 2009-151806

(51) Int. Cl.
*H04M 1/00* (2006.01)

(52) U.S. Cl.
USPC ..................... 455/575.4; 455/575.1

(58) Field of Classification Search ............... 455/550.1, 455/575.1, 575.3, 90.3, 575.4
See application file for complete search history.

(56) References Cited

U.S. PATENT DOCUMENTS

| | | | |
|---|---|---|---|
| 6,215,419 B1 | 4/2001 | Leman | |
| 7,660,410 B2 * | 2/2010 | Mizushina | 379/433.07 |
| 2006/0061943 A1 | 3/2006 | Santos et al. | |
| 2007/0123322 A1 | 5/2007 | Mizushima | |
| 2008/0051161 A1 | 2/2008 | Tashiro | |
| 2008/0132303 A1* | 6/2008 | Naukkarinen et al. | 455/575.4 |
| 2008/0167097 A1* | 7/2008 | Ko | 455/575.4 |
| 2008/0311963 A1* | 12/2008 | Strawn | 455/575.1 |
| 2009/0109325 A1 | 4/2009 | Imai et al. | |

FOREIGN PATENT DOCUMENTS

| | | | |
|---|---|---|---|
| JP | 2002-057763 A | 2/2002 | |
| JP | 2007-179525 A | 7/2007 | |
| JP | 2008-033595 A | 2/2008 | |
| JP | 2008-514137 A | 5/2008 | |

(Continued)

OTHER PUBLICATIONS

International Search Report dated Aug. 31, 2010, issued for International Application No. PCT/JP2010/061514.

*Primary Examiner* — Sonny Trinh
(74) *Attorney, Agent, or Firm* — Procopio, Cory, Hargreaves & Savitch LLP

(57) ABSTRACT

A mobile phone apparatus has a first case, a second case and a third case each taking the shape of a planar rectangle. A long side of the second case is longer than a long side of the first case, and whereby, in a closed position of the first case, a top surface of the second case is divided into a covered portion and an exposed portion. Also, on a top surface of the first case, a display is provided. Moreover, on the top surface of the second case, a QWERTY keyboard is provided at the covered portion, and a touch key including a cross key being the pointing device is provided at the exposed portion. Then, on a top surface of the third case, a numeric keypad is provided so as to be exposed in response to a sliding of the third case.

3 Claims, 8 Drawing Sheets

FOREIGN PATENT DOCUMENTS

| | | |
|---|---|---|
| JP | 2009-109895 A | 5/2009 |
| JP | 2009-110514 A | 5/2009 |
| JP | 2009-171473 A | 7/2009 |
| JP | 2010-011018 A | 1/2010 |

* cited by examiner

MOBILE PHONE APPARATUS

TECHNICAL FIELD

The present invention relates to mobile phone apparatuses. More specifically, the present invention relates to slidable mobile phone apparatuses.

BACKGROUND ART

Conventionally, slidable mobile phone apparatuses have been known, and one example of mobile phone apparatuses of such a kind is disclosed in a Patent Document 1. An electronic device according to the Patent Document 1 has three movably interconnected module layers. On the upper module layer, a display unit, directional keypads, etc. are provided, on the intermediate module layer, a phone keypad, etc. are provided, and the lower module layer, a QWERTY keyboard is provided.

When the upper module layer moves relative to the other module layer in a first direction, the phone keypad is exposed. The electronic device with the phone keypad exposed is a phone mode in which a user can use the electronic device as a mobile phone.

When the lower module layer is moved relative to the other module layer in a second direction, the QWERTY keyboard is exposed. The electronic device with the QWERTY keyboard exposed is a PDA mode, in which the user can use the electronic device as a PDA.

Furthermore, a cellular phone disclosed in a Patent Document 2 has a three-stage stacked structure including a ten-key case provided with a numeric keypad for phone of a lower stage, a full-key case of a middle stage, a display case provided with a liquid crystal display and a cursor key of an upper stage. In the cellular phone, when the ten-key case is slid, call style is established to allow the user to make a phone call. Alternatively, if the display case is turned 180° relative to the full-key case, the mobile phone is in a keyboard style to allow the user to easily create e-mail with his or her both hands.

[Patent Document 1] Japanese Patent Application Laying-Open No. 2009-110514 [G06F 3/02, H04M 1/02, G06F 1/16 H04M 1/23 H04M 1/247]

[Patent Document 2] Japanese Patent Application Laying-Open No. 2007-179525 [G06F 1/16, H04M 1/02, G06F 3/02 H05K 5/02]

SUMMARY OF THE INVENTION

Problems to be Solved by the Invention

However, in the electronic device of the Patent Document 1, the QWERTY keyboard for inputting characters and the directional keypads capable of being utilized as a pointing device are provided on the different module layers, resulting in low usability of a key operation. For example, when the user simultaneously operates the QWERTY keyboard and the directional keypads with one finger (thumb, etc.), an operation of releasing the finger has to be performed.

Then, in the cellular phone disclosed in the patent document 2 as well, a similar problem occurs.

Therefore, it is a primary object of the present invention to provide a novel mobile phone apparatus.

Another object of the present invention is to provide a mobile phone apparatus enhanced in usability.

Means for Solving the Problems

The present invention employs following features in order to solve the above-described problems. It should be noted that reference numerals and the supplements inside the parentheses show one example of a corresponding relationship with the embodiments described later for easy understanding of the present invention, and do not limit the present invention.

A first invention is a mobile phone apparatus, comprising: a first case which takes shape of a planar rectangle being formed of a first long side and a first short side; a second case which takes shape of a planar rectangle being formed of a second long side and a second short side; a first slide mechanism which couples the first case to the second case so as to be slidable in a short side direction with the first case stacked on the second case, wherein the second long side is longer than the first long side, whereby a top surface of the second case is divided into a covered portion and an exposed portion in a closed position of the first case; a third case which takes shape of a planar rectangle being formed of a third long side having approximately the same length as the second long side and a third short side; a second slide mechanism which couples the third case to the second case so as to be slidable in a long side direction with the third case beneath the second case; a display device which is provided on a top surface of the first case; a QWERTY keyboard which is provided at the covered portion of the top surface of the second case; a pointing device which is provided at the exposed portion of the top surface of the second case, and designates a position on the display device in response to being operated; and a numeric keypad which is exposed when the third case slides in the long side direction, and is provided on a top surface of the third case.

In the first invention, a mobile phone apparatus (10) has a first case (C1), a second case (C2) and a third case (C3) each taking shape of a planar rectangle. Furthermore, the second long side of the second case is longer than the first long side of the first case, and whereby, in a closed position of the first case in which the first case is stacked on the second case, the top surface of the second case is divided into a covered portion and an exposed portion. In addition, the first case and the second case are coupled with each other so that the first case is slidable in a short side direction by a first slide mechanism (50), and the second case and the third case are coupled with each other so that the third case is slidable in a long side direction by a second slide mechanism (60).

Furthermore, on a top surface of the first case, a display device (26) is provided. In addition, on the top surface of the second case, a QWERTY keyboard (22*b*) is provided at the covered portion, and a pointing device (32, 70, 72, 74) is provided at the exposed portion. Furthermore, the pointing device designates a position on the display device in response to an operation by the user, for example. Then, on the top surface of the third case, a numeric keypad (22*a*, 80, 82) is provided, and the numeric keypad is exposed when the third case slides in the long side direction.

According to the first invention, the pointing device and the QWERTY keyboard are provided to be flush with each other, whereby, it is possible to enhance usability of the mobile phone apparatus capable of simultaneously performing a character input operation and a pointing operation.

In addition, the user can use the mobile phone apparatus as a conventional slidable mobile phone apparatus by sliding the third case to thereby expose the numeric keypad.

A second invention is according to the first invention, wherein the QWERTY keyboard is provided such that a center in the long side direction is aligned with a center of the display device in the long side direction.

In the second invention, the QWERTY keyboard and the display device are provided such that the center in the long side direction of the QWERTY keyboard (P1) and the center (P2) in the long side direction of the display device are aligned with each other.

According to the second invention, the user can more easily perform the character input operation than when the centers of the display and the QWERTY keyboard are not aligned with each other. That is, developers of the maker of the mobile phone apparatus can provide the mobile phone apparatus usable for the user.

A third invention is a mobile phone apparatus, comprising: a first case which takes shape of a planar rectangle being formed of a first long side and a first short side; a second case which takes shape of a planar rectangle being formed of a second long side and a second short side; a first slide mechanism which couples the first case to the second case so as to be slidable in a short side direction with the first case stacked on the second case; wherein the second long side is longer than the first long side, whereby a top surface of the second case is divided into a covered portion and an exposed portion in a closed position of the first case; a display device which is provided on a top surface of the first case; a QWERTY keyboard which is provided at the covered portion of the top surface of the second case; and a pointing device which is provided at the exposed portion of the top surface of the second case, and designates a position on the display device in response to being operated.

In the third invention, a mobile phone apparatus (10) has a first case (C1) and a second case (C2) each taking shape of a planar rectangle. Furthermore, the second long side of the second case is longer than the first long side of the first case, whereby, in a closed position of the first case in which the first case is stacked on the second case, the top surface of the second case is divided into a covered portion and an exposed portion. In addition, the first case and the second case are coupled with each other so that the first case is slidable in a short side direction by a first slide mechanism (50).

Furthermore, on a top surface of the first case, a display device (26) is provided. In addition, on a top surface of the second case, a QWERTY keyboard (22b) is provided at the covered portion, and a pointing device (32, 70, 72, 74) is provided at the exposed portion. Furthermore, the pointing device designates a position on the display device in response to an operation by the user, for example.

According to the third invention, similar to the first invention, the pointing device and the QWERTY keyboard are provided to be flush with each other, whereby, it is possible to enhance usability of the mobile phone apparatus capable of simultaneously performing a character input operation and a pointing operation.

According to this invention, the pointing device and the QWERTY keyboard are provided to be flush with each other, whereby, it is possible to enhance usability of the mobile phone apparatus capable of simultaneously performing a character input operation and a pointing operation.

The above described objects and other objects, features, aspects and advantages of the present invention will become more apparent from the following detailed description of the present invention when taken in conjunction with the accompanying drawings.

FORMS FOR EMBODYING THE INVENTION

[First Embodiment]

Figure 1:
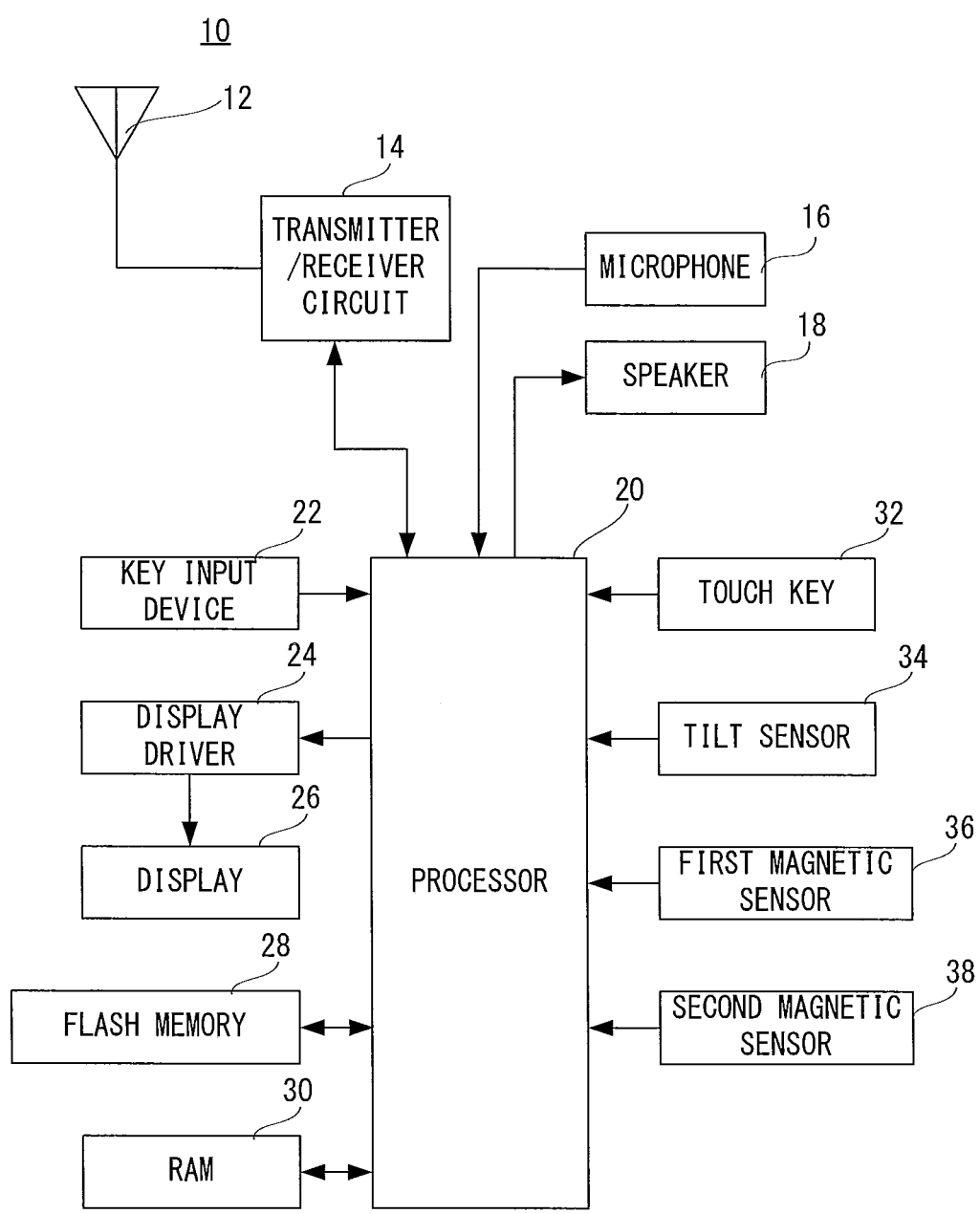
FIG. 1 is a block diagram showing an electric configuration of a mobile phone apparatus of the present invention.

Referring to FIG. 1, a mobile terminal 10 includes a processor (may be called a "CPU" or a "computer") 20, a key input device 22, and a touch key 32. The processor 20 controls a transmitter/receiver circuit 14 compatible with a CDMA system to output a calling signal. The output calling signal is issued from an antenna 12 and sent to mobile communication networks including base stations. When a communication partner performs an off-hook operation, a speech communication allowable state is established.

When a speech communication end operation is performed by the key input device 22 and the touch key 32 after a shift to the speech communication allowable state, the processor 20 sends a speech communication end signal by controlling the transmitter/receiver circuit 14. Then, after sending the speech communication end signal, the processor 20 ends the speech communication processing. Furthermore, in a case that a speech communication end signal is received as well, the processor 20 ends the speech communication processing. In addition, in a case that a speech communication end signal from the mobile communication network is received independent of the communication partner, the processor 20 ends the speech communication processing.

When a calling signal from the communication partner is received by the antenna 12 in a state the mobile phone apparatus 10 is started up, the transmitter/receiver circuit 14 notifies an incoming call to the processor 20. The processor 20 outputs an incoming call tone (may be called an incoming mail tone) from a speaker not shown, and notifies the incoming call to the user. Here, the processor 20 may vibrate the mobile phone apparatus 10 by driving a vibrator not shown, and notify the user the incoming call. Then, the processor 20 controls the display driver 24 to thereby display calling source information sent from the communication partner together with the calling signal on a display 26 as a display device.

In the speech communication allowable state, following processing is executed. A modulated audio signal (high frequency signal) sent from the communication partner is received by the antenna 12. The received modulated audio signal is subjected to demodulation processing and decode processing by the transmitter/receiver circuit 14. Then, the received voice signal that is obtained is output from a speaker 18. On the other hand, a voice signal to be transmitted that is captured by a microphone 16 is subjected to encoding processing and modulation processing by the transmitter/receiver circuit 14. Then, the generated modulated audio signal is sent to the communication partner by means of the antenna 12 as in the above description.

The touch key 32 is also called a touch sensor, and is a system called an capacitive type in which changes in capacitances between electrodes occurring by an approach of the finger to the surface of the touch key 32 and detects a touch of a finger on touch key 32. Then, the processor 20 performs predetermined processing in response to detection of the finger by the touch key 32. For example, when a phone number is input by the key input device 22, and then, the finger touches the touch key 32, the processor 20 outputs a calling signal by controlling the transmitter/receiver circuit 14.

Also, the mobile phone apparatus 10 has a data communication function, which makes it possible to perform data communications with servers not shown, and acquire variety of information (data) such as weather information, traffic information, etc. Here, during the data communication, the antenna 12 and the transmitter/receiver circuit 14 function as a communication unit, and a server not shown is connected to networks by wire or wirelessly.

Figure 2:
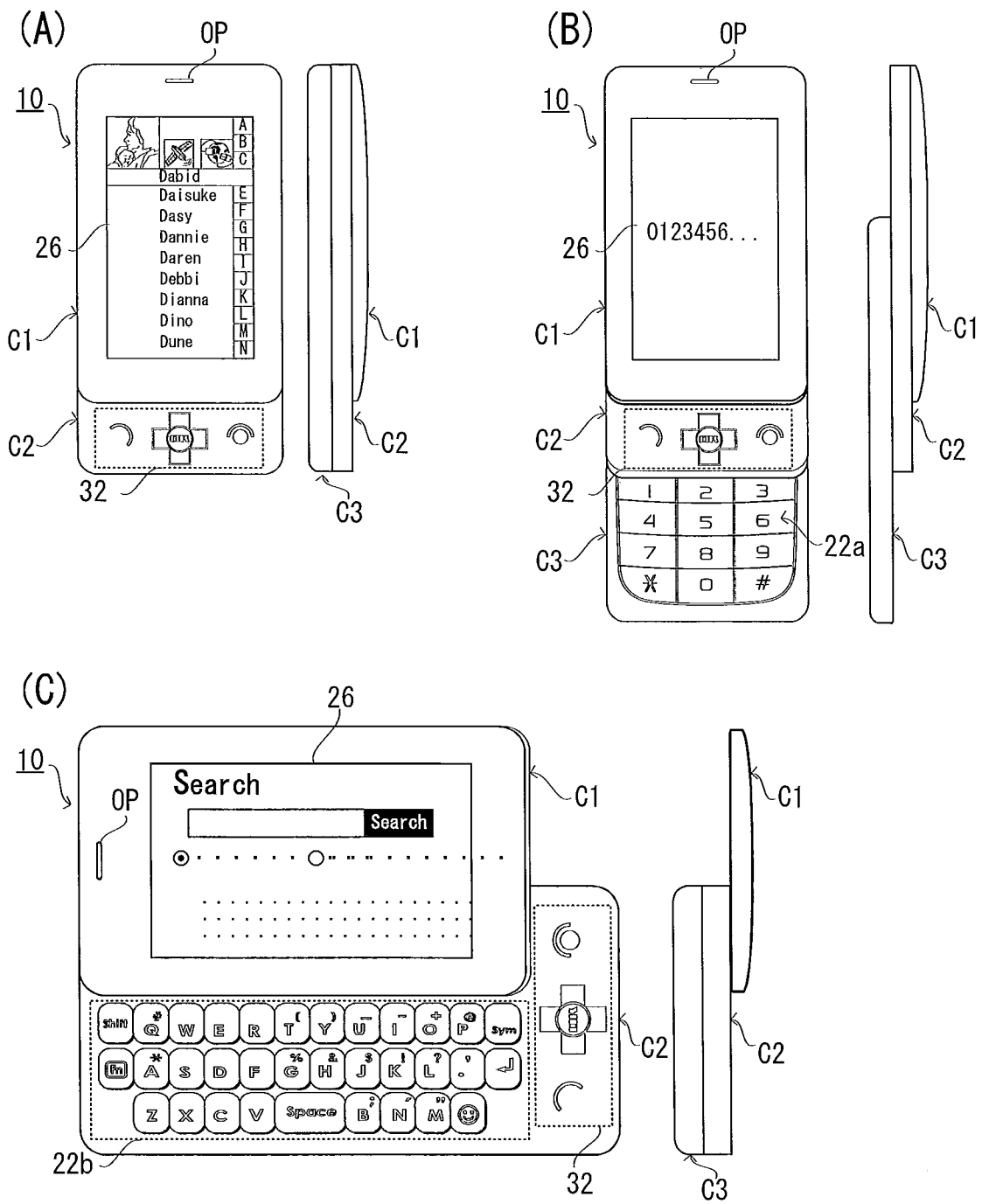
FIG. 2 is an illustrative view showing the appearance of one example of the mobile phone apparatus shown in FIG. 1.

FIG. 2 (A) is an illustrative view showing the appearance of the mobile phone apparatus 10 in a closed position, FIG. 2 (B) is an illustrative view showing the appearance of the mobile phone apparatus 10 in a first open position, and FIG. 2 (C) is an illustrative view showing the appearance of the mobile phone apparatus 10 in a second open position. With reference to FIG. 2 (A), FIG. 2 (B), and FIG. 2 (C), the mobile phone apparatus 10 has a first case C1 taking shape of a planar rectangle which is formed of a first short side and a first long side, a second case C2 taking shape of a planar rectangle which is formed of a second short side and a second long side and a third case C3 taking shape of a planar rectangle which is formed of a third short side and a third long side.

Figure 3:
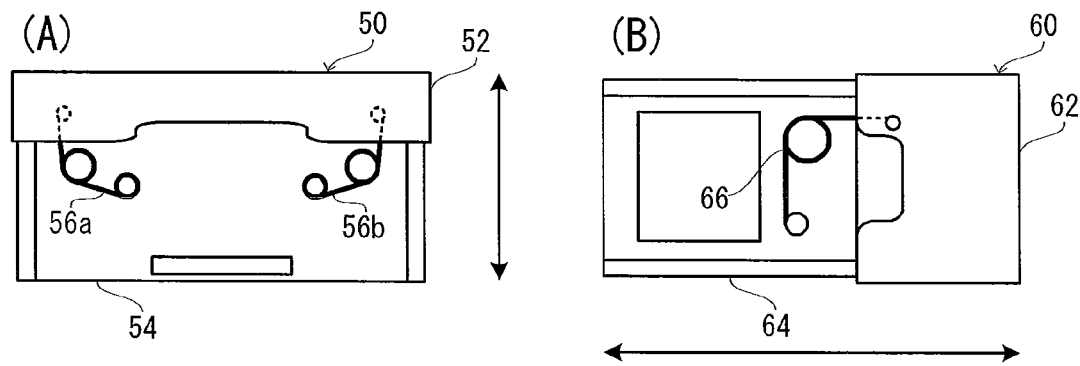
FIG. 3 is an illustrative view showing one example of the appearance of a slide mechanism included in the mobile phone apparatus shown in FIG. 1.

The first case C1 is slidably coupled to the second case C2 by a first slide mechanism 50 (see FIG. 3(A)) while being stacked thereon. Thus, the first case C1 slides relative to the second case C2 in a short side direction. Furthermore, the second long side of the second case C2 is longer than the first long side of the first case C1, and therefore, in the closed position of the first case shown in FIG. 2 (A) and FIG. 2 (B), a top surface of the second case is divided into a covered portion and an exposed portion.

The third case C3 is slidably coupled to the second case C2 by a second slide mechanism 60 while being placed beneath it (see FIG. 3(B)). Thus, the third case C3 slides relative to the second case C2 in a long side direction. Furthermore, the third long side of the third case may be slightly longer or slightly shorter than the second long side of the second case. In addition, the third long side and the second long side may have the same length. That is, the third long side and the second long side have approximately the same length.

Here, the first slide mechanism 50 and the second slide mechanism 60 that the mobile phone apparatus 10 have are described. With reference to FIG. 3(A), the first slide mechanism 50 is made up of a first plate 52, a second plate 54 and a pair of springs 56a, 56b.

The first slide mechanism 50 is placed between the first case C1 and the second case C2, and the first plate 52 is coupled to a bottom surface of the first case C1, and the second plate 54 is coupled to the top surface of the second case C2. Then, the first plate 52 is assembled with the second plate 54 so as to slide in the short side direction (up and down directions in FIG. 3(A)). Thus, the first plate 52 slides relative to the second plate 54 to thereby make the first case C1 slide relative to the second case C2 in the short side direction. Here, in this embodiment, the first plate 52 and the second plate 54 may respectively be coupled by being screw-held or may be coupled by engagement between a recessed portion and a projected portion, with respect to the first case C1 and the second case C2.

Furthermore, a pair of the springs 56a, 56b each has one end secured to the first plate 52 and the other end secured to the second plate 54. Then, by elasticity of the spring 56a and the spring 56b, the first plate 52 and the second plate 54 are maintained at states. Furthermore, the direction of the force of each of the springs 56a and 56b is reversed after the first plate 52 slides by a predetermined amount. That is, the direction of the force by each of the springs 56a and 56b is reversed, and therefore, the state that the first plate 52 is positioned above, or the state that the first plate 52 is positioned below are maintained.

Referring to FIG. 3(B), the second slide mechanism 60 is made up of a third plate 62, a fourth plate 64 and a spring 66. The second slide mechanism 60 is positioned between the second case C2 and the third case C3, and the third plate 62 is coupled to a bottom surface of the second case C2, and the fourth plate 64 is coupled to a top surface of the third case C2. Then, the third plate 62 is assembled with the fourth plate 64 so as to slide in the long side direction (horizontal direction in FIG. 3(B)). That is, a fourth plate 62 is slid to thereby make the third case C3 slide relative to the second case C2 in the long side direction.

Also, the spring 66 of the second slide mechanism 60 functions similar to the springs 56a, 56b of the first slide mechanism 50 to thereby maintain the third plate 62 and the fourth plate 64 at states.

Here, the first case C1 and the second case C2 are electrically connected by a flexible harness which is unaffected by sliding, and this holds true for the connection between the second case C2 and the third case C3. Furthermore, a coil spring is used for the springs 56a, 56b and the spring 64 but other kinds of springs, such as a plate spring, etc. may be used.

With again reference to FIG. 2 (A), FIG. 2 (B), and FIG. 2 (C), the microphone 16 not shown is contained in the third case C3, and an opening communicating with the contained microphone 16 is omitted in the drawing, but provided on the top surface of the third case C3. Similarly, the speaker 18 not shown is contained in the first case C1, and an opening OP communicating with the speaker 18 is provided at the top surface at one end of the long side direction of the first case C1.

The key input device 22 includes a numeric keypad 22a being constituted of numerical keys of 0 to 9 and a QWERTY keyboard 22b in QWERTY arrangement. Here, the numeric keypad 22a is provided on the top surface of the third case C3, and the QWERTY keyboard 22b is provided at the covered portion on the top surface of the second case.

The display 26 is provided such that the monitor screen is exposed from the top surface of the first case C1. Also, the display 26 is switched in its direction of the display depending on the state of the mobile phone apparatus 10. More specifically, it is switched on the basis of the tilt of the mobile phone apparatus 10 detected by a tilt sensor 32. The tilt sensor 32 is a semiconductive three-axis accelerometer, and outputs a gravitational acceleration of each axis to the processor 20. Then, the processor 20 detects the tilt of the mobile phone apparatus 10 by utilizing an inverse trigonometric function with respect to the value of the gravitational acceleration of each axis. Then, in a case that the mobile phone apparatus 10 is oriented longitudinally as shown in FIG. 2 (A) and FIG. 2

(B), the display of the display 26 is vertically oriented, and in a case that it is oriented laterally as shown in FIG. 2 (C), the display of the display 26 is horizontally oriented.

The touch key 32 includes a cross key functioning as a pointing device, a decision key for deciding an operation result by a user, an off-hook key, and an on-hook key. The touch key 32 is provided at the exposed portion of the top surface of the second case C2. That is, the QWERTY keyboard 22b and the touch key 32 are provided to be substantially flush with each other.

For example, the user inputs a phone number by operating the numeric keypad 22a while confirming the display 26, then performs a calling operation by touching the off-hook key included in the touch key 32, and performs a speech communication end operation by touching the on-hook key. Furthermore, the user can perform input operations in up, down, right and left directions by the cross key, and can decide the operation result by the decision key.

Here, the antenna 12, the display driver 24, the flash memory 28, the RAM 30 and the tilt sensor 34 are contained in any one of the first case C1, the second case C2 and the third case C3, and are not illustrated in FIG. 2 (A), FIG. 2 (B), and FIG. 2 (C). Furthermore, in other external views, reference numerals of the first case C1, the second case C2, the third case C3, the opening OP, the numeric keypad 22a, the QWERTY keyboard 22b, the display 26 and the touch key 32 may be omitted for simplicity.

A first magnetic sensor 36 is contained in the second case C2, and a first magnet, not shown, that pairs up with the first magnetic sensor 36 is contained in the third case C3. Furthermore, the first magnetic sensor 36 and the first magnet are contained so as to be the closest to each other in the closed position shown in FIG. 2 (A), and are contained so as to be the furthest from each other in the first open position shown in FIG. 2 (B). That is, the first magnetic sensor 36 detects the first open position shown in FIG. 2 (B).

Additionally, a second magnetic sensor 38 is contained in the second case C2 at a position different from the first magnetic sensor 36, and a second magnet, not shown, that pairs up with the second magnetic sensor 38 is contained in the first case C1. Furthermore, the second magnetic sensor 38 and the second magnet are contained so as to be closest to each other in the closed position, and are contained so as to be furthest from each other in the second open position shown in FIG. 2 (C). That is, the second magnetic sensor 38 detects the second open position shown in FIG. 2 (C).

For example, the user reads data, such as address book in the closed position, and makes a call with another mobile phone apparatus 10, etc. in the first open position. Also, the user acquires various data stored in the server by executing the data communication function in the second open position.

Figure 4:
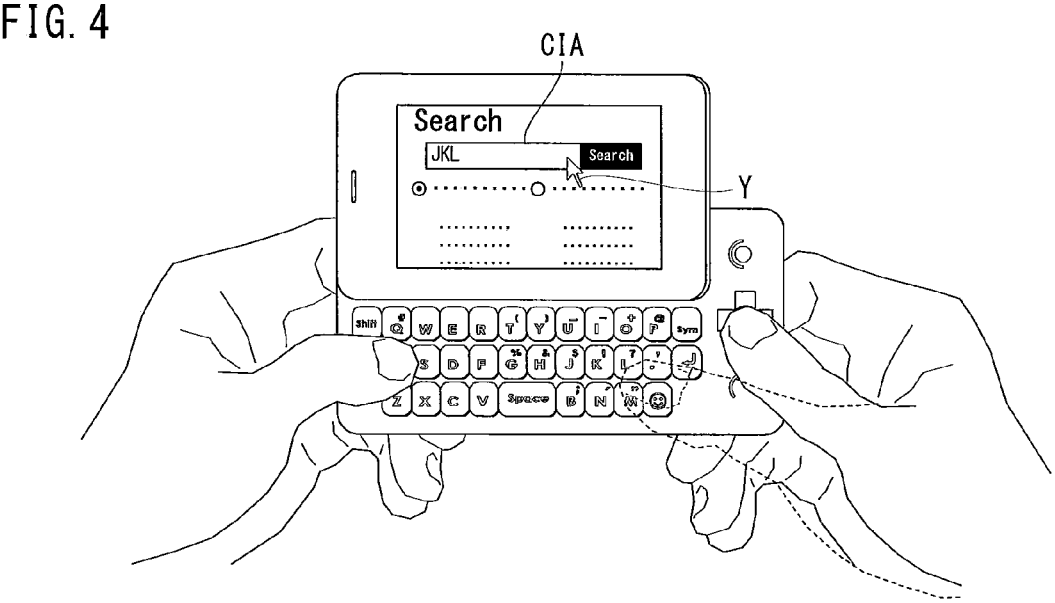
FIG. 4 is an illustrative view showing one example of an operation with respect to a QWERTY keyboard and a touch key that are shown in FIG. 2.

FIG. 4 is an illustrative view showing one example of an operation by a user with respect to the mobile phone apparatus 10 in the second open position. Referring to FIG. 4, a top screen of a certain search site acquired through the data communication function is displayed on the display 26. Also, on the display 26, an arrow icon Y for arbitrarily designating a position within a display range is displayed, and the user performs an operation of moving the arrow icon Y with the cross key. Here, in this embodiment, an operation performed on the cross key being a pointing device is referred to as "pointing operation".

For example, the user performs a pointing operation with its own thumb, and operates the decision key, to thereby designate a character input area CIA. Then, the user then moves his or her own thumb without releasing it from the top surface of the second case C2 after designating the character input area CIA, to thereby operate the QWERTY keyboard 22b. That is, the QWERTY keyboard 22b and the touch key 32 being the pointing device are provided to be substantially flush with each other, and therefore, the user can easily switch between a pointing operation and a character input operation performed on the QWERTY keyboard by merely moving his or her own thumb without releasing it from the top surface of the second case C2.

Figure 5:
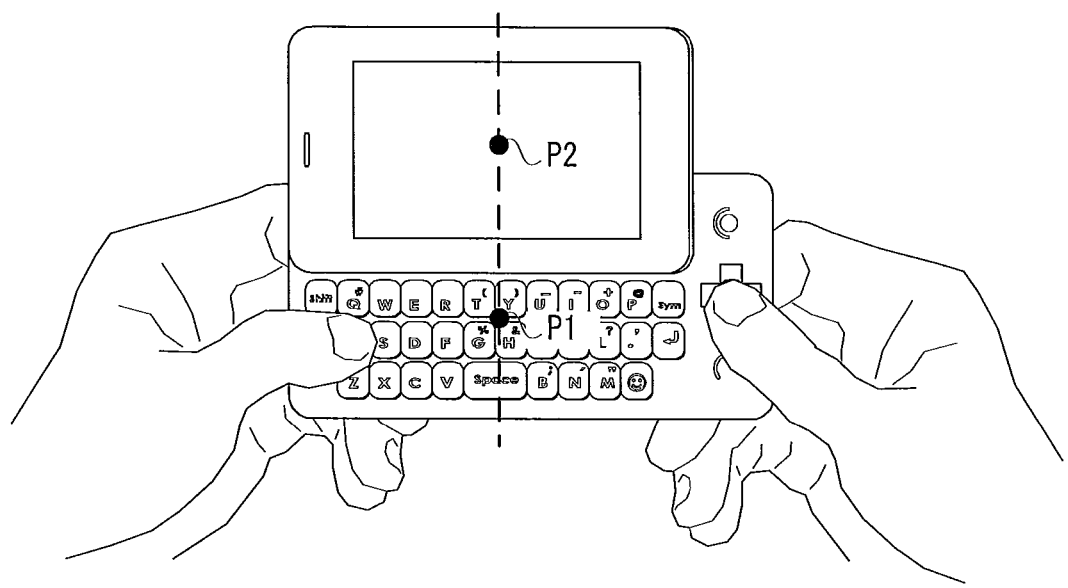
FIG. 5 is an illustrative view showing a positional relationship between a display and the QWERTY keyboard that are shown in FIG. 2.

Also, with reference to FIG. 5, the QWERTY keyboard 22b of this embodiment is provided such that a point P1 being its center in the long side direction is aligned with a point P2 being the center of the display 26 in the long side direction. Thus, the user can more easily perform a character input operation than when the center of the display 26 and the center of the QWERTY keyboard are not aligned with each other. That is, developers of the maker of the mobile phone apparatus 10 can offer the mobile phone apparatus 10 usable for the user.

Figure 6:
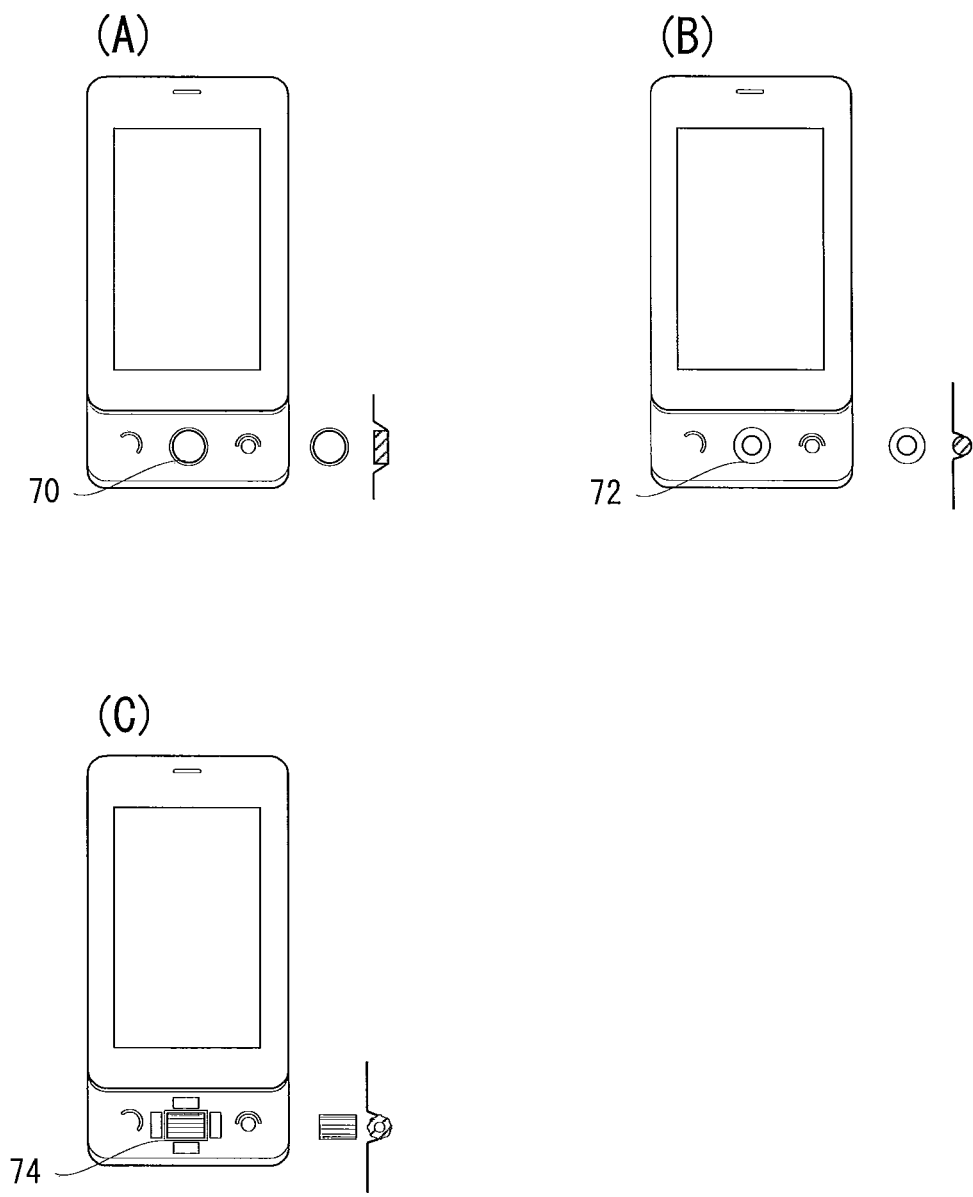
FIG. 6 is an illustrative view showing one example of other pointing devices provided in place of the touch key shown in FIG. 2.

Here, for the pointing device of the present embodiment, the cross key included in the touch key 32 is utilized, but by means of a pointing stick (TrackPoint (registered trademark), AccuPoint (registered trademark), Neuro Pointer (registered trademark)) 70 shown in FIG. 6(A), a trackball 72 shown in FIG. 6(B), etc., the arrow cursor Y may be operated. Furthermore, in place of the decision key included in the touch key 32, a jog dial 74 shown in FIG. 6(C) may be provided. Here, the pointing stick 70, the trackball 72 and the jog dial 74 are provided such that their operated portions are not protruded through the top surface of the second case C2.

[Second Embodiment]

In the second embodiment, in place of the numeric keypad 22a of the first embodiment, a sub display 80 and a touch panel 82 set on the sub display 80 may be provided.

Figures 7, 8:
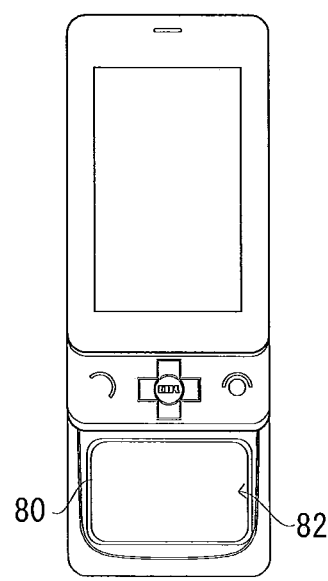
FIG. 7 is an illustrative view showing one example of a sub display and a touch panel that are provided in place of a numeric keypad shown in FIG. 2.
FIG. 8 is an illustrative view showing one example of other GUIs displayed on a sub display shown in FIG. 7.

With further reference to FIG. 7, at the exposed portion of the second case C2, the sub display 80 is provided such that its monitor screen is exposed. Then, on the top surface of the sub display 80, the electrical capacitive type touch panel 82 is provided.

Also, in the second embodiment, in a case that the mobile phone apparatus 10 is in the first open position, GUIs shown in FIG. 8(A) to FIG. 8(C) are displayed on the sub display 80. With reference to FIG. 8(A), numeric keys of 0 to 9, etc. are displayed in the key arrangement corresponding to the numeric keypad 22a on the sub display 80. That is, the sub display 82 and the touch panel 82 correspond to the numeric keypad 22a of the first embodiment, and the user inputs a phone number by operating the GUI representing the numeric keypad 22a.

Also, in a case of the mobile phone apparatus 10 equipped with a TV tuner for executing a TV viewing function, a GUI of a channel key shown in FIG. 8(B) is displayed on the sub display 80. In this case, the mobile phone apparatus 10 displays a received image on the display 26, and displays the GUI on the sub display 80 to thereby accept a channel operation by the touch panel 82. In addition, in a case of the mobile phone apparatus 10 having a music player function, a GUI of a sub-menu key shown in FIG. 8(C) may be displayed on the sub display 80. For example, in a case that a music function is executed, a GUI relating to a song title, and play-back of music data is displayed on the display 26, and a play list key for changing the music data during reproduction, a menu key for changing sound quality and a menu key for setting display of the sub display 80 are displayed on the sub display 80. Then, the user operates an arbitrary menu key by a touch operation performed on the touch panel 82.

Figure 9:
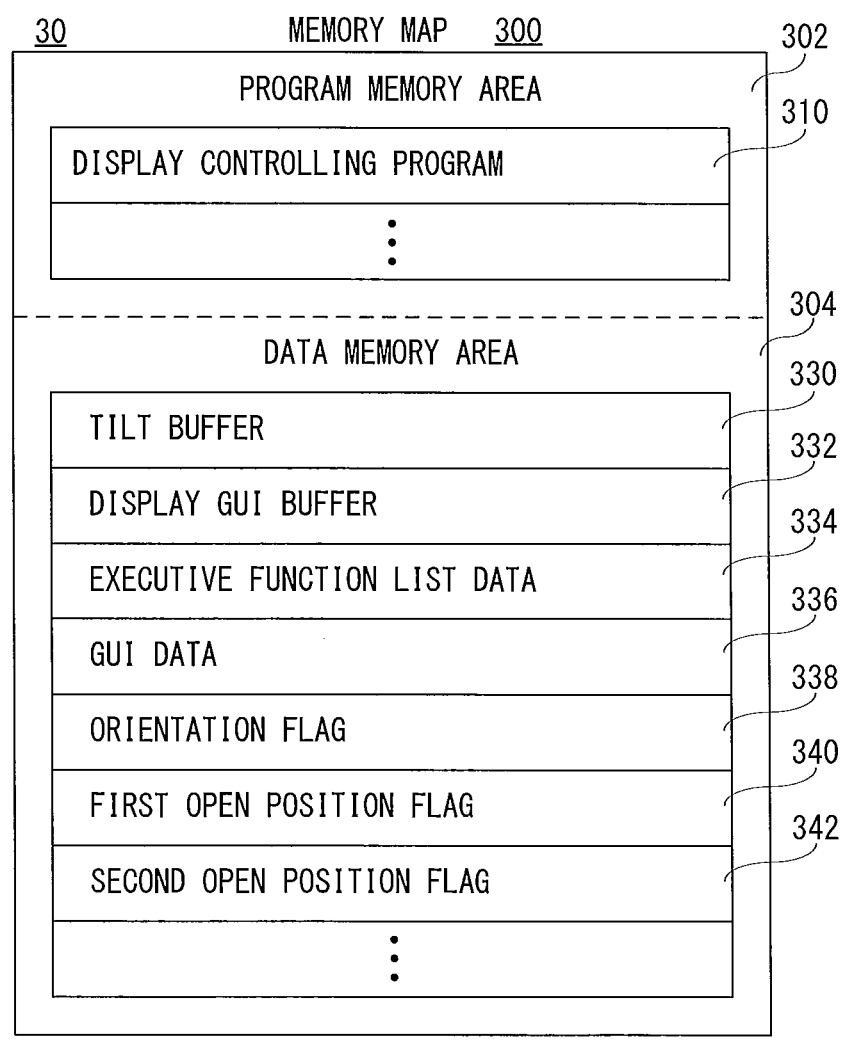
FIG. 9 is an illustrative view showing one example of a memory map of a RAM shown in FIG. 1.

FIG. 9 is an illustrative view showing a memory map of a RAM 30. With reference to FIG. 9, in the memory map of the RAM 30, a program memory area 302 and a data memory area 304 are included. A part of programs and data are read entirely at a time, or partially and sequentially as necessary from the flash memory 28, stored in the RAM 30, and then executed by the CPU 20, etc.

In the program memory area 302, a program for operating the mobile phone apparatus 10 is stored, and a display controlling program 310, etc., for example, is stored. The display controlling program 310 is a program for controlling display of the GUIs shown in FIG. 8(A) to (C). Although illustration is omitted, the program for operating the mobile phone apparatus 10 includes a program for making communications, a program for making data communications with servers on networks, etc.

In the data memory area 304, a tilt buffer 330, a display GUI buffer 332, etc. are provided. Also, in the data memory area 304, executive function list data 334, GUI data 336, etc. are stored, and an orientation flag 338, a first open position flag 340, a second open position flag 342, etc. are also provided.

The tilt buffer 330 is a buffer for temporarily storing data of a gravitational acceleration output from the tilt sensor 34. The display GUI buffer 332 is a buffer for temporarily storing image data of GUIs to be displayed on the sub display 80.

The executive function list data 332 is data storing a function ID corresponding to the function being executed in the mobile phone apparatus 10, and formed in a table form, for example. Also, the executive function list data 332 is updated every time that the function to be executed in the mobile phone apparatus 10 is changed. The GUI data 336 is made up of image data and character string data of the GUI that are to be displayed on the sub display 80.

The orientation flag 338 is a flag for determining the state of the mobile phone apparatus 10. The orientation flag 338 is constituted of one bit register, for example, and when it is turned on (established), a data value "1" is set to the register. On the other hand, when the orientation flag 338 is turned off (not established), a data value "0" is set to the register. Furthermore, the orientation flag 338 is switched between ON and OFF on the basis of the data stored in the tilt buffer 330. Here, in the present embodiment, the orientation flag 338 is turned on in a state that the mobile phone apparatus 10 is used longitudinally as shown in FIG. 2 (A) and FIG. 2 (B), and is turned off in a state that the mobile phone apparatus 10 is used laterally as shown in FIG. 2 (C).

The first open position flag 340 is a flag for determining whether in the first open position shown in FIG. 2 (B) or not. The second open position flag 342 is a flag for determining whether in the second open position shown in FIG. 2 (C) or not. Furthermore, the ON/OFF of the first open position flag 340 and the second open position flag 342 are switched on the basis of the values output from the first magnetic sensor 36 and the second magnetic sensor 38, respectively.

Although illustration is omitted, in the data memory area 304, standby image data to be displayed on the standby screen, address book data being made up of phone numbers set to other mobile terminals 10, etc. are stored, and counters and flags necessary for operating the mobile terminal 10 are also provided.

Figure 10:
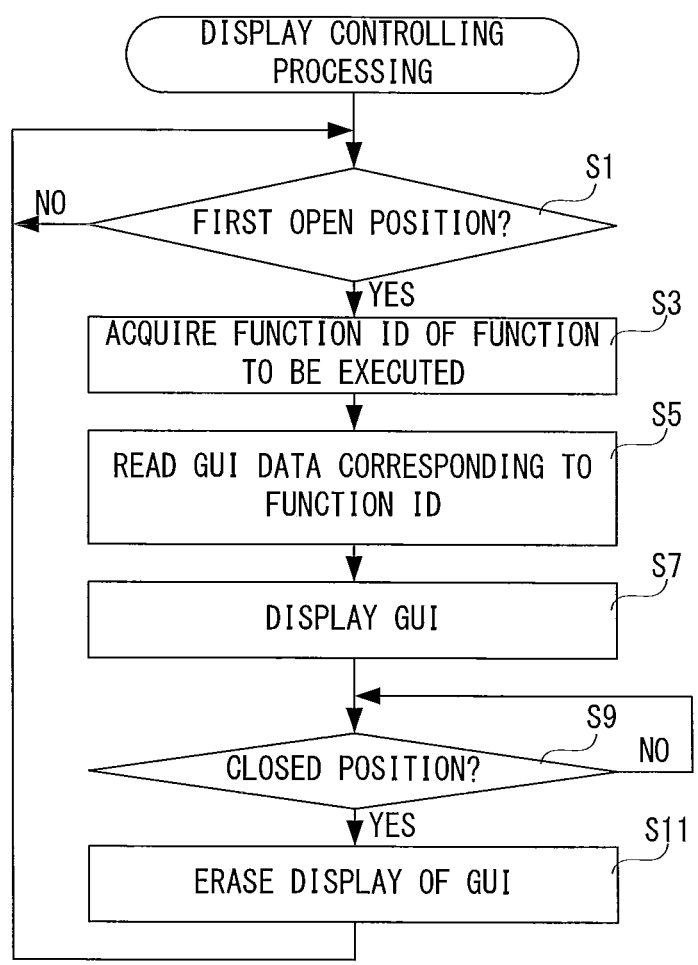
FIG. 10 is a flowchart showing a display controlling task by a processor shown in FIG. 1.

The processor 20 performs in parallel a plurality of tasks including a display controlling task, etc. shown in FIG. 10 under the control of RTOS (Real-time Operating System) such as "Linux(registered trademark) and "REX".

FIG. 10 is a flowchart showing the display controlling task. For example, when the power of the mobile phone apparatus 10 is turned on, the processor 20 determines whether or not the mobile phone apparatus 10 is in the first open position in a step S1. That is, it is determined whether or not the first open position flag 340 is turned on. If "NO" in the step S1, that is, if it is not in the first open position, the determination in the step S1 is repetitively executed. On the other hand, if "YES" in the step S1, that is, if it is in the first open position, the process proceeds to a step S3.

In the step S3, the function ID of the function to be executed is acquired. That is, from the executive function list data 334, the function ID of the function to be executed is acquired. Succeedingly, in a step S5, GUI data 336 corresponding to the function ID is read out. That is, on the basis of the function ID read in the step S3, the image data of the GUI corresponding to the function to be executed is read from the GUI data 336, and stored in the display GUI buffer 332. For example, in the step S3, if the function ID of the TV viewing function is read, the image data of the GUI representing the channel key (see FIG. 8(B)) is read from the GUI data 336.

Succeedingly, in a step S7, the GUI is displayed. That is, the image data stored in the display GUI buffer 332 is displayed on the sub display 80. For example, on the sub display 80, the GUI of the channel key shown in FIG. 8(B) is displayed. Succeedingly, in a step S9, it is determined whether in the open position or not. That is, it is determined whether or not the mobile phone apparatus 10 shifts from the first open position to the closed position on the basis of the first open position flag 340. If "NO" in the step S9, that is, if it is in the second open position, the determination in the step S9 is repetitively executed. On the other hand, if "YES" in the step S9, that is, if it shifts to the closed position, the process proceeds to a step S11. Then, in the step S11, the display of the GUI is erased, and the process returns to the step S1. That is, in the step S11, the display of the sub display 80 representing the GUI is erased.

Thus, in the second embodiment, in place of the numeric keypad 22a, the sub display 80 and the touch panel 82 can be utilized. Also, in the second embodiment, the display controlling task is executed, and therefore, the sub display 80 and the touch panel 82 can be worked as an input assister capable of being utilized depending on the functions to be executed in the mobile phone apparatus 10.

As understood from the above, the slidable mobile phone apparatus 10 includes the first case C1, the second case C2 and the third case C3 each taking shape of a planar rectangle. In addition, the second long side is longer than the first long side, and therefore, the top surface of the second case C2 is divided into the covered portion and the exposed portion in the closed position of the first case C1. In addition, the first case C1 and the second case C2 are coupled with each other by the first slide mechanism 50 such that the first case C1 is slidable in the short side direction, and the second case C2 and the third case C3 are coupled with each other by the second slide mechanism 60 such that the third case C3 is slidable in the long side direction.

Furthermore, on the top surface of the first case C1, the display 26 is provided. In addition, on the top surface of the second case C2, the QWERTY keyboard 22b is provided at the covered portion, and the touch key 32 including the cross key being the pointing device is provided at the exposed portion. Then, on the top surface of the third case C3, the numeric keypad 22a is provided so as to be exposed in response to a slide of the third case.

Thus, the pointing device and the QWERTY keyboard are provided to be flush with each other, and therefore, it is possible to enhance usability of the mobile phone apparatus 10 capable of simultaneously performing a character input operation and a pointing operation.

Also, the user can use the mobile phone apparatus 10 as a conventional slidable mobile phone apparatus by sliding the third case C3 and exposing the numeric keypad 22a.

In addition, in the mobile phone apparatus 10 of the present embodiment, the touch key 32 is provided at the exposed portion of the second case C2, and the numeric keypad 22a is provided on the top surface of the third case C3, and therefore, the user can easily switch operations between the numeric keypad 22a and the touch key 32. For example, if the touch key 32 is provided on the top surface of the first case C1, the touch key 32 and the numeric keypad 22a are far away from each other due to the thickness of the second case C2. In this case, it is more difficult for the user to switch the operations between the numeric keypad 22a and the touch key 32 than that of the mobile phone apparatus 10 of the present embodiment.

Here, in this embodiment, for the first display 26, an LCD monitor is utilized, but other display devices such as an organic light emitting panel may be used. Furthermore, by the first magnetic sensor 36 and second magnetic sensor 38, the closed position, the first open position and the second open position of the mobile phone apparatus 10 are detected, but they may be detected by utilizing a mechanical switch and other sensors. Moreover, the cross key included in the touch key 32 may be formed of a mechanical switch key.

Moreover, for the communication system of the mobile terminal 10, a W-CDMA system, a TDMA system, a PHS system and a GSM system, etc. may be adopted without being restricted to the CDMA system.

Although the present invention has been described and illustrated in detail, it is clearly understood that the same is by way of illustration and example only and is not to be taken by way of limitation, the spirit and scope of the present invention being limited only by the terms of the appended claims.

Explanation of Reference Characters

10 . . . mobile phone apparatus
    20 . . . processor
    22 . . . key input device
    22a . . . numeric keypad
    22b . . . QWERTY keyboard
    26 . . . display
    32 . . . touch key
    50 . . . first slide mechanism
    60 . . . second slide mechanism
    70 . . . pointing stick
    72 . . . trackball
    74 . . . jog dial
    80 . . . sub display
    82 . . . touch panel
    C1 . . . first case
    C2 . . . second case
    C3 . . . third case

What is claimed is:

1. A mobile phone apparatus, comprising:
a first case which takes shape of a planar rectangle being formed of a first long side and a first short side;
a second case which takes shape of a planar rectangle being formed of a second long side and a second short side;
a first slide mechanism which couples said first case to said second case so as to be slidable in a short side direction with said first case stacked on said second case, wherein said second long side is longer than said first long side, whereby a top surface of said second case is divided into a covered portion and an exposed portion in a closed position of said first case;
a third case which takes shape of a planar rectangle being formed of a third long side having approximately the same length as said second long side and a third short side;
a second slide mechanism which couples said third case to said second case so as to be slidable in a long side direction with said third case beneath said second case;
a display device which is provided on a top surface of said first case;
a QWERTY keyboard which is provided at said covered portion of said top surface of said second case; and
a pointing device which is provided at said exposed portion of said top surface of said second case, and designates a position on said display device in response to being operated.

2. A mobile phone apparatus according to claim 1, wherein said QWERTY keyboard is provided such that a center in said long side direction is aligned with a center of said display device in said long side direction.

3. A mobile phone apparatus, comprising:
a first case which takes shape of a planar rectangle being formed of a first long side and a first short side;
a second case which takes shape of a planar rectangle being formed of a second long side and a second short side;
a first slide mechanism which couples said first case to said second case so as to be slidable in a short side direction with said first case stacked on said second case; wherein said second long side is longer than said first long side, whereby a top surface of said second case is divided into a covered portion and an exposed portion in a closed position of said first case;
a display device which is provided on a top surface of said first case;
a QWERTY keyboard which is provided at said covered portion of said top surface of said second case;
a pointing device which is provided at said exposed portion of said top surface of said second case, and designates a position on said display device in response to being operated; and
a numeric keypad which is exposed when said third case slides in said long side direction, and is provided on a top surface of said third case.

* * * * *